United States Patent
Lawrence

(10) Patent No.: US 6,665,724 B2
(45) Date of Patent: Dec. 16, 2003

(54) METHOD FOR AUTOMATICALLY DELAYING INITIALIZATION OF A PROTOCOL STACK WITHIN A NETWORK INTERFACE

(75) Inventor: Thomas David Lawrence, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,803

(22) Filed: Jul. 20, 1999

(65) Prior Publication Data

US 2003/0140153 A1 Jul. 24, 2003

(51) Int. Cl.[7] .............................................. G06F 15/16
(52) U.S. Cl. ........................ 709/230; 709/220; 709/222
(58) Field of Search ................................. 709/230, 236, 709/213, 220, 221, 222; 370/457, 469; 358/1.15

(56) References Cited

U.S. PATENT DOCUMENTS

| | | | |
|---|---|---|---|
| 5,537,417 A | 7/1996 | Sharma et al. ............. 370/94.1 |
| 5,696,899 A | 12/1997 | Kalwitz .................... 395/200.1 |
| 5,699,350 A | 12/1997 | Kraslavsky .................. 370/254 |
| 5,701,411 A | * 12/1997 | Tran et al. ................... 709/250 |
| 5,721,818 A | * 2/1998 | Hanif et al. ................. 370/469 |
| 5,752,003 A | 5/1998 | Hart ........................... 395/500 |
| 5,754,747 A | 5/1998 | Reilly et al. ................. 395/114 |
| 6,101,545 A | * 8/2000 | Balcerowski et al. ........ 370/464 |
| 6,122,287 A | * 9/2000 | Ohanian et al. ............. 370/465 |
| 6,208,952 B1 | * 3/2001 | Goertzel et al. ............. 709/228 |

* cited by examiner

Primary Examiner—Mark Powell
Assistant Examiner—William C. Vaughn, Jr.
(74) Attorney, Agent, or Firm—Fitzpatrick, Cella, Harper & Scinto

(57) ABSTRACT

A network interface device that is capable of supporting a plurality of protocols on a heterogeneous LAN, and that triggers the initialization of at least one loaded, but uninitialized, protocol stack upon the automatic detection of a network communication on the LAN that is supported by the protocol stack. The network interface device is also capable of triggering the initialization of at least one loaded, but uninitialized, protocol stack upon the receipt of a network services or status request from an application software module that requires the support of the protocol stack.

106 Claims, 6 Drawing Sheets ns. In this case of a heterogeneous LAN, a network interface
METHOD FOR AUTOMATICALLY DELAYING INITIALIZATION OF A PROTOCOL STACK WITHIN A NETWORK INTERFACE

BACKGROUND OF THE INVENTION

1. Field of the Invention

The present invention concerns the use of a software protocol stack within a network interface device in which initialization of the protocol stack is delayed until the automatic detection of a network communication conforming to the specific protocol supported by the protocol stack. More particularly, the present invention includes a network interface device which has the capability of communicating with other network devices by using a plurality of different protocol stacks and which has the capability of delaying the initialization process for a given protocol stack until such time that a network communication supported by the protocol stack is automatically detected, thereby reducing transmissions of unwanted and unnecessary initialization-related network communication from the network interface device.

2. Description of the Related Art

Local area networks (LANs) are widely used for the purpose of connecting a plurality of computers and computer related devices including printers, copiers and other peripherals and devices. On a given LAN wiring architecture, such as Ethernet, a plurality of different communication protocols may be utilized for communication between the different devices on the LAN. A LAN which is capable of supporting a plurality of different communication protocols is commonly referred to as a "heterogeneous" or "multiprotocol" LAN. Examples of such communication protocols include, but are not limited to, TCP/IP, IPX/SPX, NetBIOS, NETBEUI and AppleTalk.

A computer or electronic device may communicate on a LAN via hardware known as a network interface device. A network interface device can be a network expansion board locally attached to the computer or device, a network expansion device locally attached to the computer or device, or a network interface board locally attached to the computer or device. In the alternative, the network interface device may comprise a network interface board or a network expansion board that is embedded within the computer or device and locally attached thereto. Alternatively, for some electronic devices such as network-ready smart appliances (digital cameras, digital sound recorders, personal organizers, etc.), a network interface device is implemented directly within the processor and/or circuitry of the electronic device without the need for a separate network interface board or network expansion board attached to, or embedded within the electronic device. In this manner, a network may be utilized to inter-connect a diversity of devices such as personal computers, printers, scanners, copiers, digital cameras, and other smart appliances. A network interface device such as an embedded network expansion board within a network printer can communicate with other devices on a heterogeneous LAN by containing an appropriate protocol stack corresponding to each of the protocols being utilized by the other devices. A protocol stack is a software module that processes packets of network data pursuant to a specific protocol. The packets of network data are either received from or transmitted to the LAN by devices connected to the LAN. The protocol stack ensures that the data communication between two or more devices on the LAN is in compliance with the preset rules of the corresponding protocol.

In the case of a heterogeneous LAN, a network interface device should support each of the protocols in use on the LAN in order for the device to be accessible to the other computers and devices on the LAN. For example, a network printer with an embedded network expansion board must be capable of supporting the protocols in use on the LAN so as to facilitate service of print requests from the other computers and devices on the LAN.

A network interface device is commonly configured to support a plurality of protocols by loading the corresponding protocol stacks within the network interface device. Software modules commonly referred to as a network interface driver and a protocol multiplexer are also loaded in the network interface device. The network interface driver is a low-level software that communicates directly with the network interface hardware, which is connected to the LAN. The protocol multiplexer provides a common interface between each of the loaded protocol stacks and the network interface driver. After being loaded, each of the loaded protocol stacks establishes an interface with the protocol multiplexer. Establishing this interface is commonly referred to as "binding" the protocol stack to the protocol multiplexer. Binding a protocol stack to the protocol multiplexer enables the protocol multiplexer to (i) receive packets from the LAN that are supported by the protocol stack and then pass them to the protocol stack, and (ii) transmit packets to the LAN as directed by the protocol stack.

The initialization process for a protocol stack is commonly performed immediately after the protocol stack is loaded within the network interface device. The initialization process for certain protocol stacks may include the transmission of at least one packet on the LAN in order to obtain information from another device on the LAN that is necessary for the configuration of the protocol stack, such as address and other network-related information. For example, an AppleTalk protocol stack typically broadcasts at least one packet over the network during its initialization process in order to obtain the specific network address and zone information required to configure the protocol stack for appropriate communication with other devices on the LAN which are also utilizing the AppleTalk protocol.

Multi-protocol devices, such as network printers and copiers, typically configure themselves to support a plurality of protocols even if one or more of the protocols are not currently being utilized on the LAN. For example, it is common for a network printer that supports AppleTalk in addition to other protocols, such as TCP/IP or IPX, to load and initialize the AppleTalk protocol stack even though the network printer resides on a LAN that is currently only utilizing the TCP/IP and IPX protocols. In this manner, the network printer blindly loads all protocol stacks that it is capable of supporting without regard to the protocols that are currently being utilized on the LAN.

As mentioned above, during initialization of a protocol stack for a protocol such as AppleTalk, the network interface device transmits at least one initialization-related broadcast packet, even when that protocol is not currently being utilized by any other device on the LAN. This results in the unexpected or unwanted transmission of packets of a particular protocol on a network that is not currently utilizing that protocol. These unexpected or unwanted packets may be confusing or distracting to network administrators who may be totally unfamiliar with the particular protocol because it is not currently being utilized on the network. Additionally, these unnecessary or unwanted packet transmissions may result in increased traffic on the LAN, thereby potentially affecting the throughput capacity for other network devices on the LAN. Protocol stacks for protocols other than Apple-Talk may transmit multicast, instead of broadcast, packets during initialization in a similar manner.

One solution to this problem, as described in U.S. Pat. No. 5,699,350 to Kraslavsky, is to prevent the network interface device from loading any protocol stack at all until a PRESCAN software module residing within the network interface device detects network traffic on the LAN conforming to a protocol that is supported by one of the corresponding protocol stacks. Upon such detection, the corresponding protocol stack is loaded and initialized for use by the network interface device. For example, on a heterogeneous LAN which is not currently utilizing the AppleTalk protocol, the AppleTalk protocol stack would not be loaded and initialized until the PRESCAN software module residing within the network interface device detects the presence of AppleTalk network traffic on the LAN.

Although the solution presented in Kraslavsky prevents the transmission of unwanted initialization-related messages, it requires the loading and continuous execution of a PRESCAN software module within the network interface device. The PRESCAN software module has the undesirable effect of monitoring all network traffic in order to determine whether a given protocol is currently being utilized on the network. This continuous monitoring results in increased processing overhead within the network interface device, thereby potentially adversely affecting the response time of the network interface device.

SUMMARY OF THE INVENTION

What is needed, therefore, is a network interface device that is capable of supporting a plurality of protocols on a heterogeneous LAN, and that loads all protocol stacks that it is capable of supporting but then delays initialization of one or more protocol stacks until such time as the use of the corresponding protocols on the LAN is detected by the network interface device.

It is an object of the present invention to delay the initialization of a protocol stack that has been loaded in a multiprotocol network interface device until such time as the network interface device automatically detects network traffic from another device on the LAN that conforms to the protocol corresponding to the protocol stack. The protocol stack initialization process is thereby triggered upon the detection of network traffic on the LAN that conforms to the protocol corresponding to the protocol stack.

It is another object of the invention to trigger the protocol stack initialization process for a loaded, but uninitialized, protocol stack upon the receipt by the protocol stack of a network services or status request from an application software module residing within the computer or peripheral to which the network interface device is locally attached or embedded or within the network interface device itself. These and other objects, features and advantages are accomplished by the present invention.

In a first aspect, the network interface device of the present invention loads a protocol stack but delays the protocol stack initialization process. The protocol stack's initialization process is automatically triggered upon receipt of a network packet from the LAN which conforms to the protocol that is supported by the protocol stack. More specifically, a protocol stack is loaded in a network interface device but the initialization process for the protocol stack is not started. The network interface device is then enabled to receive packets from the LAN that include address and data information and that conform to the protocol supported by the loaded, but uninitialized, protocol stack. Upon receipt of such a packet from the LAN, the initialization process for the corresponding loaded, but uninitialized, protocol stack is then executed. The initialization process of the protocol stack includes the transmission by the network interface device of at least one packet on the LAN for obtaining initialization-related information which is used to configure the protocol stack appropriately.

For example, a network interface device that is locally attached to, or embedded within a network printer, and that is interfaced to a LAN that is currently utilizing only the TCP/IP protocol, loads a protocol stack for AppleTalk in addition to a protocol stack for TCP/IP but temporarily delays initialization of the AppleTalk protocol stack. The AppleTalk protocol stack then binds itself to a protocol multiplexer software module in the network interface device, thereby enabling the protocol multiplexer to accept from the LAN all packets that conform to the AppleTalk protocol. After receipt of an AppleTalk packet from the LAN, the protocol multiplexer passes the packet to the AppleTalk protocol stack upon which the initialization process for the AppleTalk protocol stack is executed. The AppleTalk protocol stack initialization process includes the transmission of at least one initialization-related packet on the LAN in order to obtain network address and other network data necessary for the configuration of the AppleTalk protocol stack.

By virtue of this arrangement, the network interface device does not transmit unwanted or unnecessary initialization-related packets until necessary to configure a loaded, but uninitialized, protocol stack during its subsequent initialization. Moreover, the uninitialized protocol stack is automatically initialized at such time as the network interface device detects network traffic on the LAN that is supported by that particular protocol stack. In the present invention, the network interface device ordinarily performs this automatic protocol stack initialization without the need for loading and executing additional software modules in the network interface device.

In a second aspect of the invention, the network interface device loads a protocol stack but delays its initialization until a later time. The protocol stack initialization process can then be subsequently triggered upon receipt by the protocol stack of a network packet conforming to the protocol supported by the protocol stack as discussed above. In addition, the protocol stack initialization process can also be triggered upon receipt by the protocol stack of a network services or status request from an application software module residing within the computer or peripheral device that is locally attached to the network interface device or from an application software module within the network interface device itself.

More specifically, and as previously described above in the first aspect of the invention, the protocol stack initialization process can be triggered upon the receipt of a packet from the LAN that conforms to the corresponding protocol. In the present aspect of the invention, the protocol stack initialization process can also be triggered upon the receipt of a network services or status request from an application software module being executed within the computer or peripheral device that is locally attached to the network interface device or from an application software module being executed within the network interface device itself.

In this manner, the initialization process for the protocol stack can be triggered either by the receipt of a local request from an application software module or by the receipt of a packet from the LAN which corresponds to the protocol stack.

For example, a network interface device that is locally attached to, or embedded within, a computer, and that is interfaced to a LAN utilizing only the TCP/IP protocol, loads an AppleTalk protocol stack in addition to a TCP/IP protocol stack, but temporarily delays initialization of the AppleTalk protocol stack. The AppleTalk protocol stack then binds itself to a protocol multiplexer software module, thereby enabling the protocol multiplexer to accept from the LAN all packets that conform to the AppleTalk protocol. Upon receipt of an AppleTalk packet from the LAN, the protocol multiplexer passes the packet to the AppleTalk protocol stack. If the AppleTalk protocol stack is in an uninitialized state upon receipt of an AppleTalk packet from the protocol multiplexer, the AppleTalk protocol stack initialization process is then executed.

The AppleTalk protocol stack is also in communication with an application software module that is loaded and being executed within the network printer that is locally attached to the network interface device, or within the network interface device itself. The application software module can initiate network service and status requests that require the support of the AppleTalk protocol stack for processing. If the AppleTalk protocol stack is in an uninitialized state upon receipt of such a network service or status request, the AppleTalk protocol stack initialization process is then executed. The AppleTalk protocol stack initialization process includes the transmission of at least one initialization-related packet on the LAN in order to obtain network address and other network data necessary for the configuration of the protocol stack.

By virtue of this arrangement, the network interface device does not transmit unwanted or unnecessary initialization-related packets of the protocol that corresponds to the loaded, but uninitialized, protocol stack. Moreover, the loaded, but uninitialized, protocol stack is subsequently automatically initialized at such time as the network interface device detects network traffic that is supported by the protocol stack or at such time as an application software module requests network services or status that requires support from the protocol stack. In the present invention, the network interface device ordinarily performs this automatic protocol stack initialization without the need to load and execute additional software modules within the network interface device.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The present invention is generally applicable to any device, such as a computer, peripheral or other device, that is in communication with other devices via a network which is capable of supporting multiple protocols. In the preferred embodiment, the invention is used in an embedded network interface device, such as a network expansion board (NEB), for connecting a printer, or other peripheral or device, to a network. Similarly, the invention can be used in a network interface board (NIB), a network expansion device (NED), or other network connection devices for connecting a printer or other peripheral or computer, to a network. In the preferred embodiment, the present invention is utilized to delay initialization of an AppleTalk protocol stack within a network printer until such time as AppleTalk traffic is detected on the network or such time as the network printer requires the support of the AppleTalk protocol stack. The present invention can also be utilized with protocol stacks other than AppleTalk, and with other network attached devices such as computers, copiers, scanners, digital cameras and smart appliances.

Figure 1:
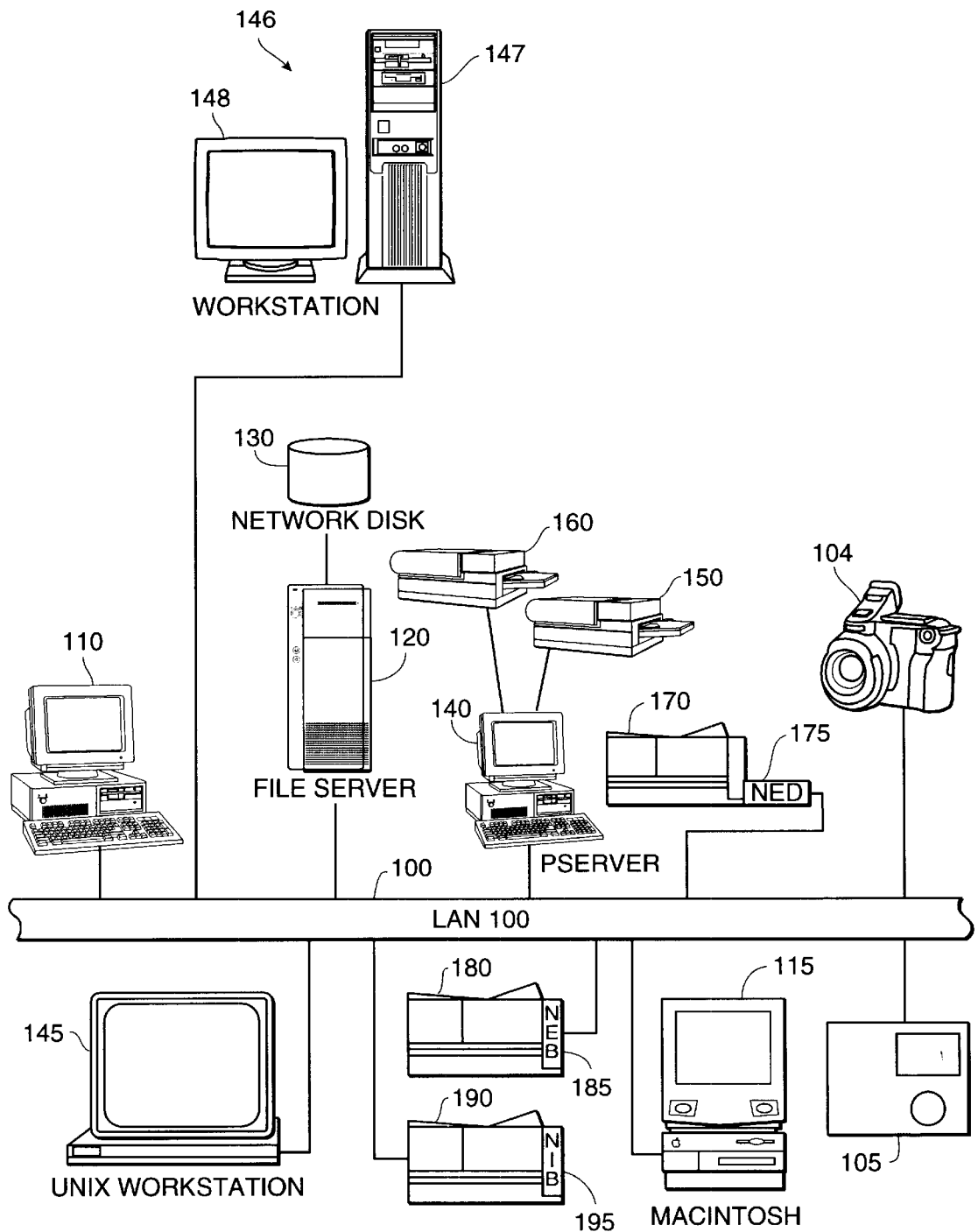
FIG. 1 is an overall system view of a local area network using an Ethernet medium.

FIG. 1 provides an overall system view of a network that includes computers, peripherals and other devices. The network comprises local area network (LAN) 100, a plurality of computers, and a plurality of peripherals and devices for access by the computers on the network. The computers depicted in FIG. 1 include a personal computer (PC) 110 which is utilized for system administration, a PC 140 which is utilized as a print server for printers 150 and 160, a MacIntosh type computer 115, a UNIX type work station 145 and a general work station 146 which has a central processing unit 147 and a display 148. A file server 120 is also provided on the network which allows shared access to a network disk 130. Also attached to the network are a digital camera 104 and a smart appliance 105, such as a network-ready digital camera, both of which contain an embedded network interface device (not shown). Printer 170 is accessible to other network devices by means of a network expansion device (NED) 175. Printer 180 is accessible to other network devices by means of a network expansion board (NEB) 185, which is preferably embedded within printer 180. Printer 190 is accessible to other network devices by means of a network interface board (NIB) 195, which is preferably embedded within printer 190. LAN 100 is preferably an Ethernet network medium consisting of a bus-type physical architecture.

Figure 2:
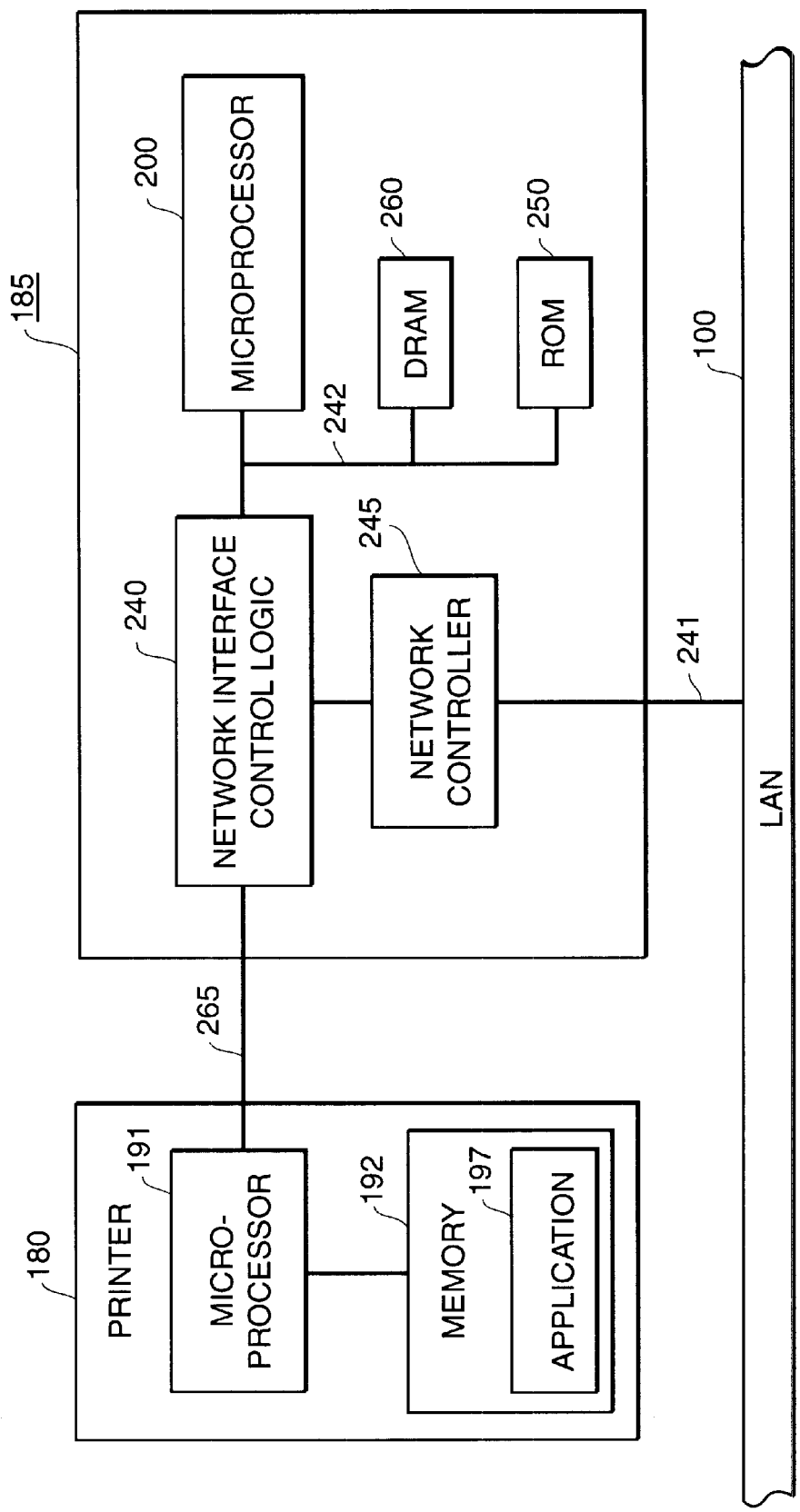
FIG. 2 is a block diagram of a network expansion board.

FIG. 2 provides a functional block diagram of NEB 185. Generally, NEB 185 consists of an interactive network circuit board which provides an interface between printer 180 and LAN 100. The interface provided by NEB 185 allows the other network devices, such as computers and peripherals, to access and utilize the functions provided by printer 180. NEB 185 acts to receive communication packets from LAN 100 which contain print data, status requests and control commands. NEB 185 also communicates print data, status requests and control commands to printer 180 and transmits status and other information regarding printer 180 over LAN 100. NEB 185 can therefore allow other network users and devices to utilize print services on printer 180 and can provide status and control information regarding printer 180 to other network users and devices.

NEB 185 contains network interface control logic 240 and network controller 245 for interfacing NEB 185 with LAN 100, microprocessor 200, ROM (read only memory) 250 and DRAM (direct random access memory) 260. Network interface control logic 240 provides an interface between LAN 100 (via network controller 245), and microprocessor 200, ROM 250 and DRAM 260 by means of data bus 242. ROM 250 contains software modules, such as protocol stacks and print servers, which are accessed as needed by microprocessor 200 and temporarily placed in DRAM 260 for execution in microprocessor 200. Preferably, ROM 250 consists of two 2 MB (megabyte) 16-bit flash EPROM (erasable programmable ROM) devices and DRAM 260 consists of two 2 MB 16-bit DRAM devices which can be accessed simultaneously to operate as a 32-bit data bus. In the preferred embodiment, microprocessor 200 is a 32-bit processor, such as a 50 MHz Toshiba TMPR3904AF RISC microprocessor, with built-in DRAM/ROM controller, DMA controller, interrupt controller, timer/counter, serial port and parallel port. Network interface control logic 240 is preferably a 25 MHz ASIC (application specific integrated circuit), such as Toshiba TC203E2801F03, that provides an interface between data bus 242, device data bus 265, and network controller 245. Network interface control logic 240 also preferably contains 32 kilobytes SRAM (static random access memory) to support 16-bit data transfer over device data bus 265. Network controller 245 is preferably a dual-speed, 10/100 Mbps Ethernet Controller, such as Toshiba TC35815AF, that supports 32-bit data transfer to and from network interface control logic 240, and is in communication with LAN 100 via a network transceiver (not shown) which is preferably capable of supporting 10 and 100 Mbps CSMA/CD Ethernet physical architectures. The above preferred hardware components can be replaced with any similar hardware and/or software components that perform similar functions.

NEB 185 communicates with printer 180 over device data bus connection 265. In the preferred embodiment, printer 180 has memory 192 for storing software modules, and microprocessor 191 which executes said software modules. At least one application software module 197 resides in memory 192 of printer 180 and, upon execution by microprocessor 191, software module 197 sends network requests for service and status to NEB 185 by means of device data bus 265. A similar application software module may also be stored in ROM 250 and executed within microprocessor 200 of NEB 185.

To provide for a specific configuration of NEB 185 upon initialization, a configuration file 75 (not shown) is stored in ROM 250 and is processed by microprocessor 200 upon power-on or receipt of a boot-up command in NEB 185. In the alternative, configuration file 75 may be stored in a non-volatile random access memory (NVRAM) (not shown). The configuration file 75 directs microprocessor 200 to partition DRAM 260 in a particular manner, and identifies which memory-resident software modules are to be loaded from ROM 250 into the partitioned areas of DRAM 260, and also directs which software modules are to be started by microprocessor 200 as concurrently executed tasks, and the like.

Figure 3:
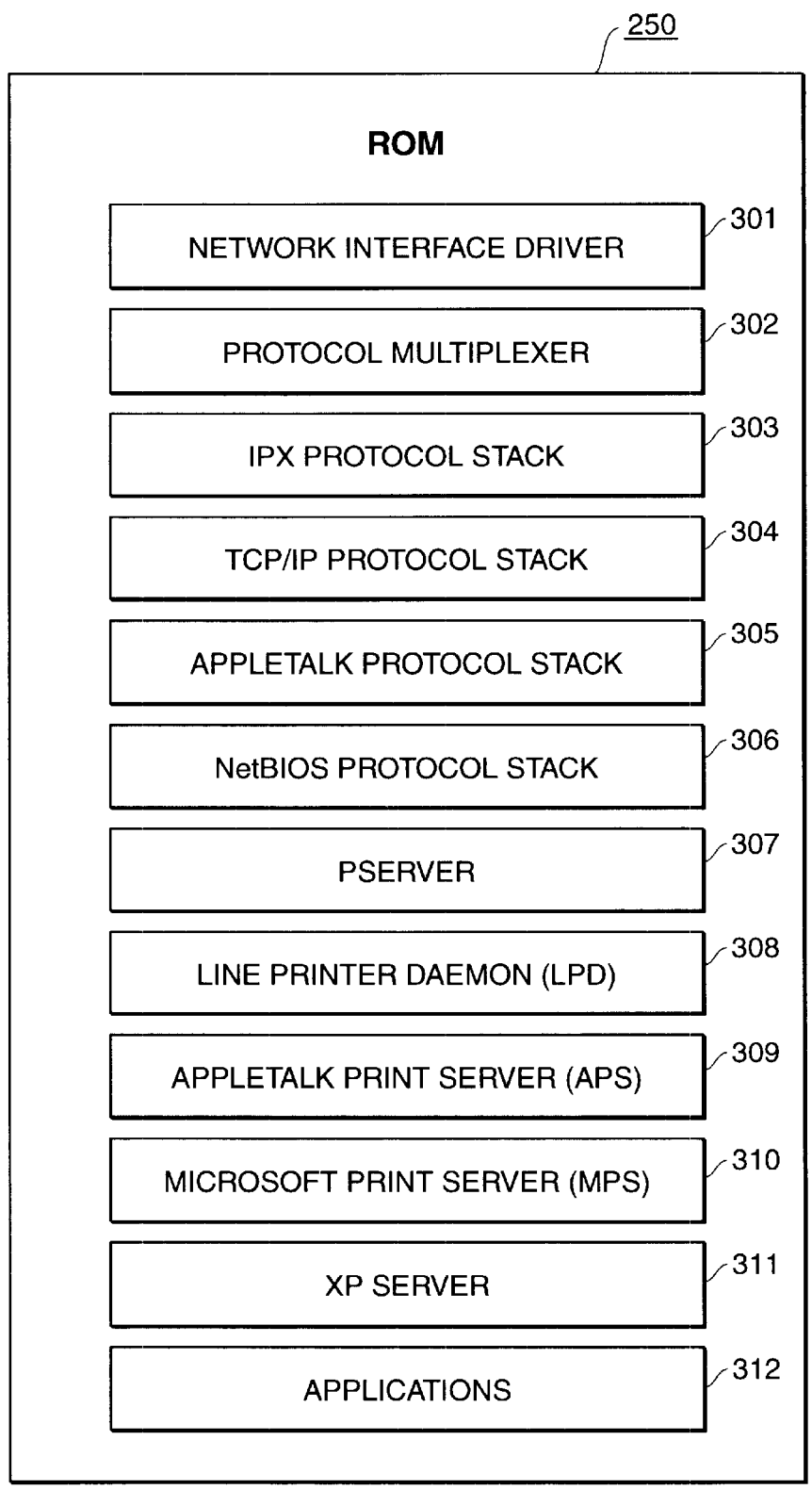
FIG. 3 is a view illustrating software program modules stored in a memory of a network expansion board.

FIG. 3 illustrates an example of the software modules (also referred to as programs) that are stored within ROM 250 of NEB 185. Network interface driver 301 serves as the low-level software communication interface between NEB 185 and LAN 100 via network interface control logic 240 and network controller 245. Protocol multiplexer 302 interfaces between network interface driver 301 and a plurality of protocol stack software modules stored in ROM 250 of NEB 185. The plurality of protocol stack software modules includes an IPX protocol stack module 303 for supporting the IPX/SPX protocol used in a Novell-based network environment, a TCP/IP protocol stack module 304 for supporting the TCP/IP protocol used in a UNIX-based network environment, an AppleTalk protocol stack module 305 for supporting the AppleTalk protocol used in an Apple computer-based network environment, and a NetBIOS protocol stack 306 for supporting the NetBIOS protocol used in a Microsoft Windows 3.1, Windows 95 or Windows NT. Other protocols, such as NETBEUI, may also be supported by additional protocol stacks stored within ROM 250.

After being loaded, each of protocol stacks 303–306 registers ("binds") with protocol multiplexer 302 thereby enabling protocol multiplexer 302 to provide the protocol stacks with all received packets that conform to the protocol supported by each particular protocol stack. Protocol stacks 303–306 receive packets from protocol multiplexer 302 corresponding to their respective protocols, determine what processing needs to be performed with the packets and then initiate the necessary processing for each packet. Each of the protocol stacks 303–306 corresponds to supporting printer server software modules 307–310 for handling printer-related requests and commands to and from printer 180. PSERVER 307 supports IPX protocol stack 303, LPD (Line Printer Daemon) 308 supports TCP/IP protocol stack 304, AppleTalk Print Server 309 supports AppleTalk protocol stack 305, and Microsoft Print Server 310 supports NetBIOS protocol stack 306. XPSERVER 311 is a software module that provides a standardized software interface between NEB 185 and printer 180 so as to provide communication between the printer servers 307–310 and printer 180, thereby transmitting print requests and status requests between them. Other software modules, such as applications 312, can also reside within ROM 250.

Figure 4:
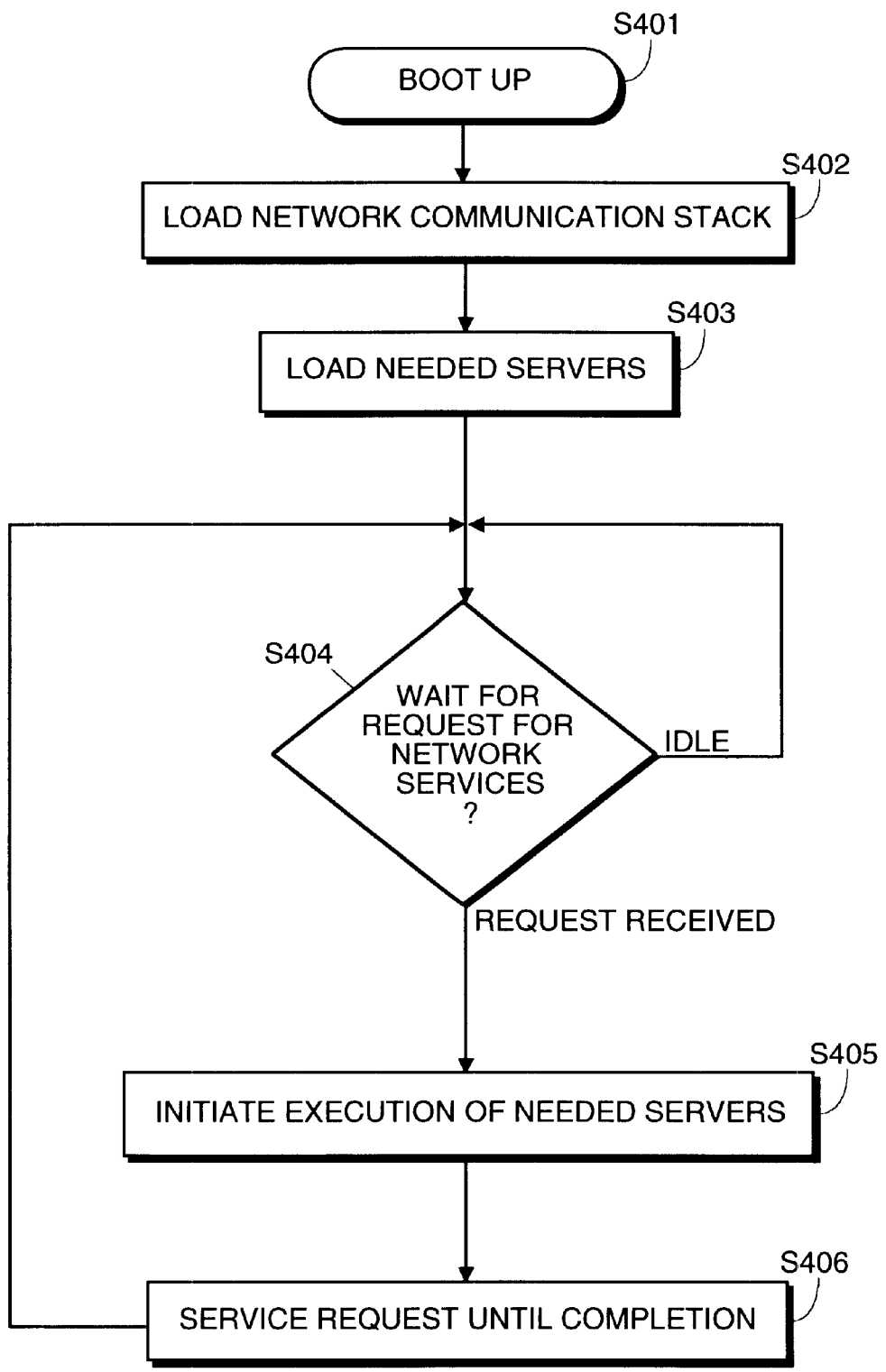
FIG. 4 is a flow diagram for explaining the general operation of a network interface board.

Operation of NEB 185 is explained with reference to the flow diagram depicted in FIG. 4. The process steps shown in FIG. 4 are executed by microprocessor 200 by first loading the software modules from ROM 250 into DRAM 260 as needed, and then executing the process steps from DRAM 260. In step S401, upon application of power or suitable logic reset, microprocessor 200 initiates boot-up processing by reference to configuration file 75 which fixes the configuration of NEB 185, such as the allocation of DRAM 260 for various memory-resident programs such as protocol stack software modules, and the initiation and loading of various program modules.

As shown in FIG. 4, in step S402, microprocessor 200 loads its network communication software. Specifically, microprocessor 200 loads network interface driver 301 and protocol multiplexer 302 into memory allocated for them (typically high memory), and in addition loads whatever protocol stack software modules 303–305 are needed for processing network communications on LAN 100, as indicated by default configuration information contained in configuration file 75. Configuration file 75 also identifies which of the loaded protocol stack software modules should be loaded in DRAM 260 but not immediately initialized after loading. The present invention provides a method for automatic initialization of these loaded, but uninitialized, protocol stacks as discussed in further detail below.

Referring again to FIG. 4, in step S403 the needed network servers are loaded in step S403. Then, in step S404, NEB 185 waits for a request for network services. Until a request for network services is received, NEB 185 stands by in an idle state, responding to access inquiry commands from printer 180 with simple acknowledgment responses. On the other hand, as soon as a request for network services is received, either from the network or from the local device such as printer 180, control advances to step S405. In steps S405 and S406, the received network services request is serviced. In particular, in step S405, microprocessor 200 initiates execution of the appropriate network server in response to the request for network services. In step S406, microprocessor 200 continues execution of the needed server so as to service the request. Then, control returns to S404 to wait for additional requests for network services. Meanwhile, services already being processed in step S406 continue until they are complete. Should additional requests be received, microprocessor 200 initiates execution of the appropriate server (step S405) and begins servicing the request (step S406). Concurrent network processing, to the extent physically supported by NEB 185 and printer 180, is then carried out.

The present invention automatically triggers the initialization of a loaded, but uninitialized, protocol stack by taking advantage of the operational relationships that exist between the network communication software modules shown in FIG. 3, printer 180 and LAN 100. By monitoring network services and status requests from an application software module in printer 180 or NEB 185, and by monitoring network traffic from LAN 100, NEB 185 determines whether the support of a loaded, but uninitialized, protocol stack is needed and, if so, the loaded protocol stack's initialization process is executed. As stated above, the preferred embodiment of the present invention delays the initialization of an AppleTalk protocol stack until it is determined that the AppleTalk protocol stack is needed, thereby preventing unwanted or unnecessary transmission of initialization-related AppleTalk messages. The present invention may also be used to delay the initialization of other protocol stacks in the same manner.

Figure 5:
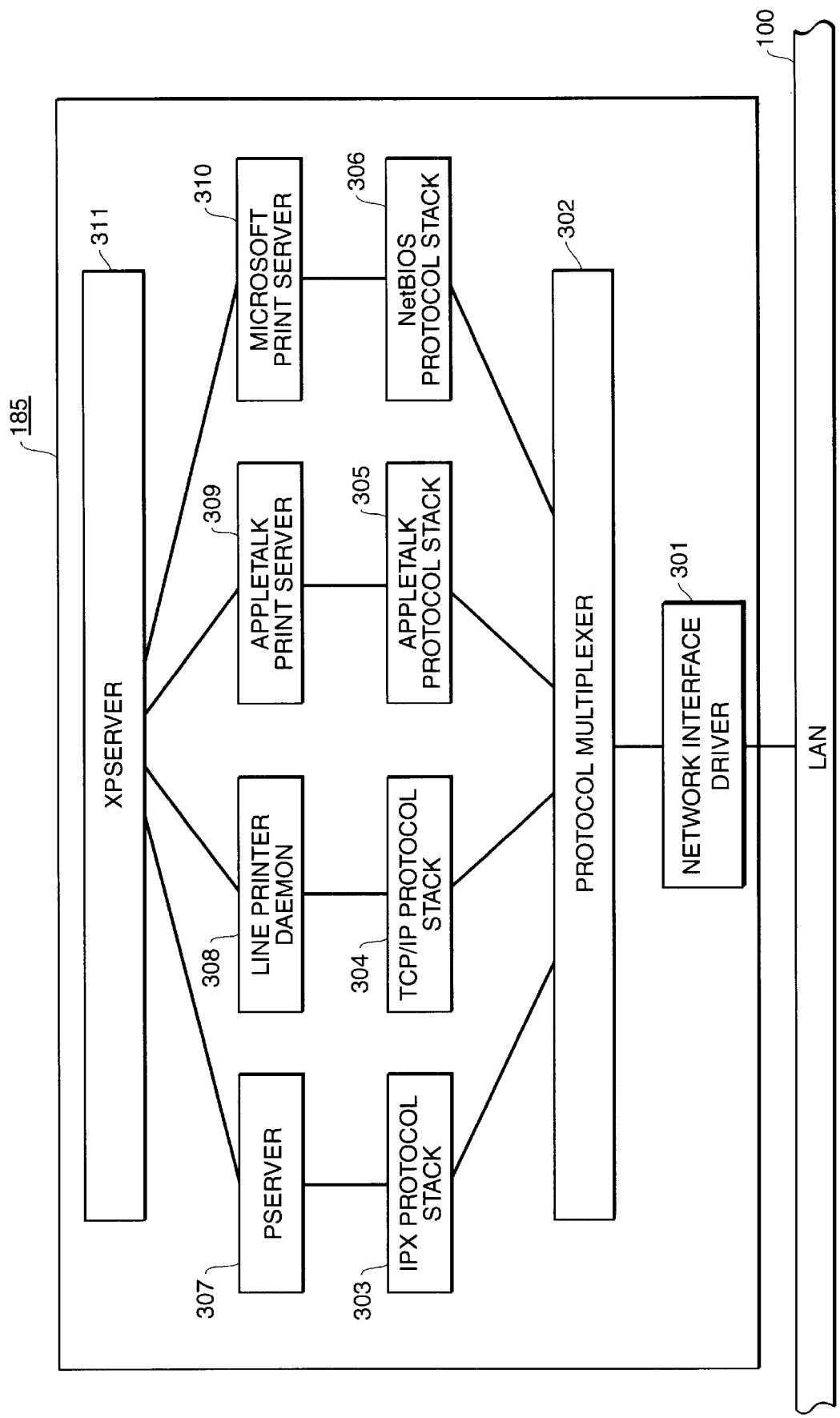
FIG. 5 is a diagram showing the network communication software architecture present within a network expansion board.

FIG. 5 shows the software architecture in NEB 185 after network communication software is loaded, including the protocol stacks specified for loading by configuration file 75. As shown in FIG. 5, network interface driver 301 is the lowest level software module in the software architecture and provides an interface between NEB 185 and LAN 100. Protocol multiplexer 302, is loaded above network interface driver 301 and multiplexes between a plurality of protocol stacks 303–306 and network interface driver 301. Protocol stacks 303–306 are loaded above protocol multiplexer 302. In the preferred embodiment, configuration file 75 specifies that IPX protocol stack 303, TCP/IP protocol stack 304, and NetBIOS protocol stack 306 are to be loaded and initialized immediately after loading, but that AppleTalk protocol stack 305 is to be loaded and left uninitialized until needed by NEB 185. In this manner, unwanted and unnecessary transmission of initialization-related AppleTalk packets is avoided until the AppleTalk protocol stack is needed by NEB 185.

Printer servers 307–310 are loaded above their corresponding, loaded protocol stacks 303–306 in order to process requests for printer services or status to and from the corresponding protocol stacks 303–306. XPSERVER 311 is loaded above the loaded protocol stacks 303–306 and print servers 307–310. Other high level software modules, such as applications 312 (not shown in FIG. 5), may also be loaded above the aforementioned modules. The passing of network service and status requests to the appropriate corresponding protocol stacks is an important aspect of the present invention for automatically triggering the initialization of a loaded, but uninitialized, protocol stack as further described below.

A relationship between protocol multiplexer 302 and each of the loaded protocol stacks 303–306 is established when each protocol stack is loaded, even for those particular protocol stacks such as AppleTalk that are left uninitialized until a later time. Each loaded protocol stack registers (also referred to as "binds") with protocol multiplexer 302, thereby enabling protocol multiplexer 302 to route to that protocol stack the received packets that conform to the protocol corresponding to that protocol stack. This relationship between protocol multiplexer 302 and each of the loaded protocol stacks is also an important aspect of the present invention for automatically triggering the initialization of a loaded, but uninitialized, protocol stack which is described next.

Figure 6:
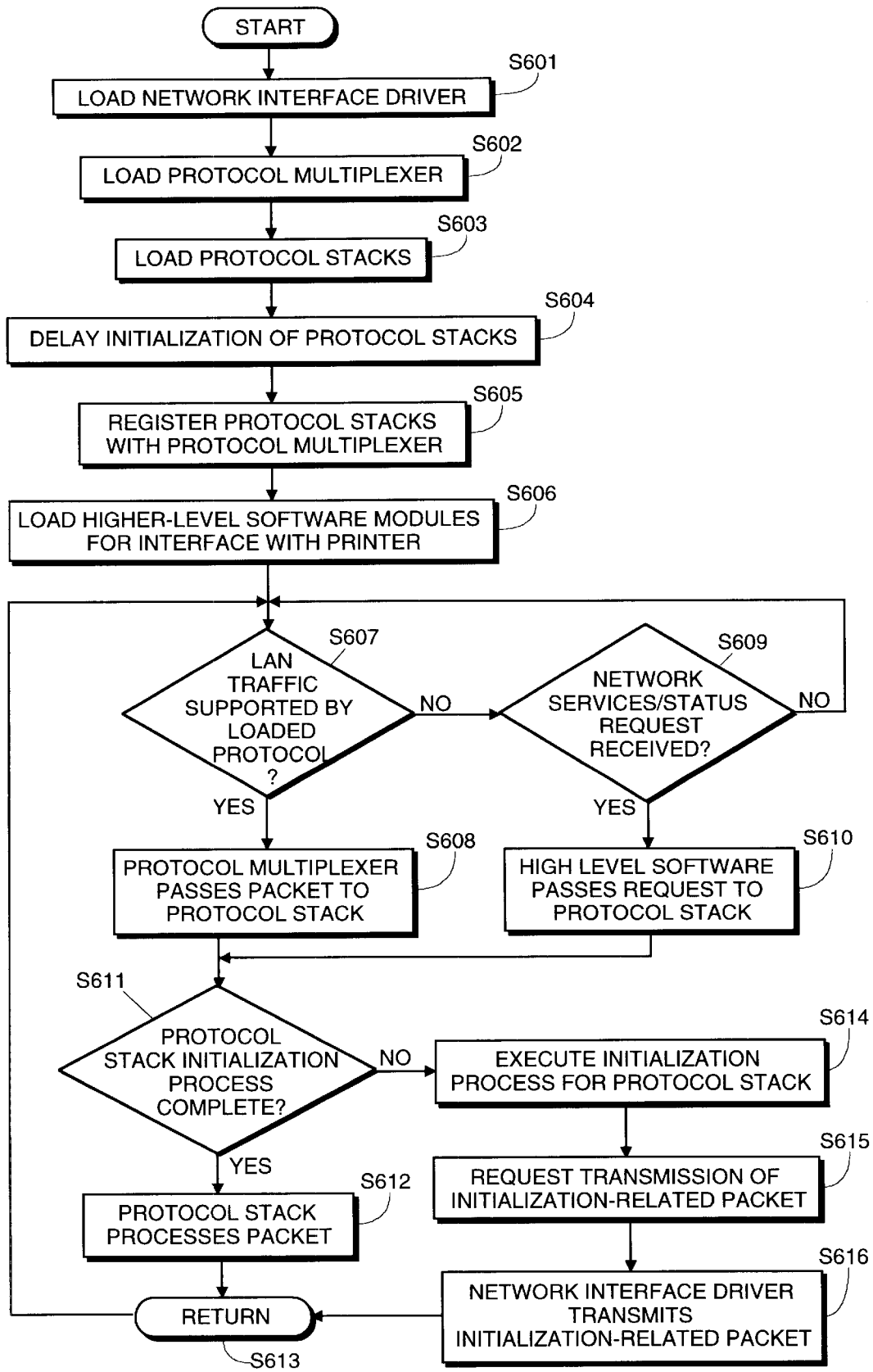
FIG. 6 is a flow diagram showing the process steps of the present invention for automatically triggering the initialization of a loaded, but uninitialized, protocol stack.

FIG. 6 is a flow diagram for showing process steps of the present invention for automatically triggering the initialization of a loaded, but uninitialized, protocol stack. Specifically, the preferred embodiment of the present invention automatically triggers the initialization of a loaded, but uninitialized, AppleTalk protocol stack. The hardware that implements the process steps of FIG. 6 can be understood by briefly returning to FIG. 2. In general, referring to FIG. 2, software modules stored in ROM 250 are loaded into DRAM 260 under the control of microprocessor 200 and then executed as required by microprocessor 200. Network communication packets are received by NEB 185 from LAN 100 and are routed to network interface control logic 240. Packets that are intended for NEB 185 are then stored in DRAM 260 under the control of microprocessor 200. The packets are then routed between software modules within NEB 185 by passing their corresponding memory addresses. In addition, application software module 197 in printer 180 sends network services and status requests to NEB 185 via device data bus 265. A similar application software module being executed in NEB 185 may also send network services and status requests directly to protocol stacks 303–306 within NEB 185.

Referring now to FIG. 6, in step S601, microprocessor 200 loads and begins executing network interface driver 301 which acts as the low-level interface between NEB 185 and LAN 100. In step S602, microprocessor 200 loads and then begins executing protocol multiplexer 302. As described above, protocol multiplexer 302 acts as an interface between the low-level network interface driver 301 and each of protocol stacks 303–306 which are loaded above protocol multiplexer 302. In step S603, microprocessor 200 loads the protocol stacks from ROM 250 into DRAM 260, as specified by configuration file 75, above protocol multiplexer 302. In the preferred embodiment, configuration file 75 specifies that protocol stacks 303–306 are to be loaded. In step S604, initialization of AppleTalk protocol stack 305 is delayed as directed by configuration file 75. The other protocol stacks 303, 304 and 306 proceed with their respective initialization processes immediately after loading. Configuration file 75 may also specify other protocol stacks that are to be left uninitialized after being loaded. Each loaded protocol stack, including the uninitialized ones, registers with the protocol multiplexer 302 in step S605, thereby enabling protocol multiplexer 302 to route packets that are received from LAN 100 and that conform to one of the loaded protocols to the appropriate corresponding loaded protocol stack for further processing.

In step S606, microprocessor 200 loads higher level network communication software modules such as XPSERVER 311 and applications 312. As previously discussed, XPSERVER 311 receives and processes network services and status requests from printer 180 via device data bus 265 and passes them on to the appropriate protocol stacks for processing. Network services and status requests may also be received by protocol stacks 303–306 from applications 312 within NEB 185. XPSERVER 311 also accepts network print requests from printer servers 307–310 and passes them on to printer 180 for processing.

Control then advances to step S607 in which protocol multiplexer 302 monitors LAN 100 via network interface driver 301 for network communication traffic that is supported by the loaded protocol stacks. Specifically, in step S607, LAN 100 is monitored by network interface driver 301 for communication packets which are being transmitted on LAN 100 by another device and which are addressed to NEB 185 or which are addressed as multicast or broadcast traffic (traffic that is directed to an address that is recognized by multiple network devices) and which conform to a protocol supported by one of the loaded protocol stacks. Broadcast traffic is typically identified by using a global specification for the destination address; for example, 12 hexadecimal F's in sequence identify the packet as a broadcast packet.

If network interface driver 301 determines that broadcast traffic or traffic addressed to NEB 185 is present on LAN 100 that conforms to a protocol supported by one of the loaded protocol stacks, the packet is then provided to protocol multiplexer 302. Control then passes to step S608 in which protocol multiplexer 302 passes the received packet to the particular loaded protocol stack that corresponds to the protocol utilized by that packet. For example, if an AppleTalk multicast packet is detected by protocol multiplexer 302 on LAN 100, the packet is received and then sent to already loaded AppleTalk protocol stack 305. Control then passes to step S611 which is discussed in further detail below.

Returning briefly to step S607, if multicast traffic, broadcast traffic or traffic addressed to NEB 185 which is supported by one of the loaded protocol stacks is not detected on LAN 100, control passes to step S609. Network interface driver 301 and protocol multiplexer 302 continue to monitor LAN 100 for multicast traffic, broadcast traffic or traffic addressed to NEB 185 after control is passed to step S609. In step S609, a determination is made by a high level software module within NEB 185, such as XPSERVER 311, whether a network services or status request has been received from an application software module, such as application software module 197 in printer 180 or applications 312 in NEB 185, that requires the support of one of the loaded protocol stacks. If not, control returns to step S607 to continue monitoring LAN 100 for multicast traffic, broadcast traffic or traffic addressed to NEB 185 that also corresponds to a loaded protocol stack.

If a network services or status request has been received that requires support from one of the loaded protocol stacks (step S609), control passes to step S610 in which the high level software module that received the network services request passes the request to the appropriate loaded protocol stack. Control then passes to step S611 in which the protocol stack that either received a packet from protocol multiplexer 302 (step S608) or received a network services or status request (step 610), as the case may be, is checked to determine whether the protocol stack's initialization process has been completed. If the protocol stack has already been initialized, the protocol stack processes the packet as needed in step S612. Control then passes by way of return step S613 to step S607 for continued monitoring of LAN traffic and of network services and status requests.

If the protocol stack in step S611 has not yet completed its initialization process, such as the AppleTalk protocol stack of the present embodiment, control proceeds to step S614 in which the initialization process for the protocol stack is executed by microprocessor 200. In the preferred embodiment, the initialization process of AppleTalk protocol stack 305 proceeds to step S615 in which AppleTalk protocol stack 305 passes a request to protocol multiplexer 302, along with associated data, for the transmission of at least one initialization-related AppleTalk packet on LAN 100. In step S616, network interface driver 301 receives the transmission request and associated data from protocol multiplexer 302 and then initiates transmission of the requested packets over LAN 100. Control then returns by way of step S613 to step 607 for further monitoring.

By this arrangement, AppleTalk protocol stack 305, or another protocol stack that corresponds to a protocol that is supported by, but not presently in use on LAN 100, is loaded by NEB 185 but is not initialized until use of the corresponding protocol is detected on LAN 100 or until a network services or status request is received from an application software module in printer 180 or NEB 185 that requires the use of the corresponding protocol. Thus, the present invention provides two triggers for automatically initializing a loaded, but uninitialized, protocol stack such as AppleTalk wherein (i) the initialization can be triggered upon the receipt of a packet from the network that corresponds to the protocol stack, or (ii) the initialization can be triggered upon the receipt of a network services or status request from an application software module. These two trigger mechanisms are independent, yet they work to accomplish the result of automatically triggering the initialization of a loaded but uninitialized protocol stack when the need arises. In this manner, NEB 185 is prevented from transmitting unwanted or unnecessary protocol stack initialization-related packets on LAN 100 until it determines that the use of the protocol stack is needed. Although a preferred form of the present invention is described above for delaying initialization of an AppleTalk protocol stack in a network printer having an embedded network interface, the present invention can also be applied to other types of protocol stacks, network interface devices, and network environments.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for automatically triggering a protocol stack initialization process within a network interface device on a network on which a plurality of protocols may be utilized, said method comprising the steps of:

executing a process within the network interface device which loads an uninitialized protocol stack that supports one of the plurality of protocols for communication on the network and that is configured to be initialized by an initialization process;

temporarily prohibiting execution of the initialization process for said loaded and uninitialized protocol stack;

enabling the network interface device to receive packets from the network that include address and data information and that conform to said one of the plurality of protocols; and executing the initialization process for said loaded and uninitialized protocol stack upon receipt of a packet from the network conforming to said one of the plurality of protocols, said initialization process including the enablement of the network interface device to communicate packets on the network that include address and data information and that conform to said one of the plurality of protocols.

2. A method according to claim 1, wherein said step of enabling the network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

3. A method according to claim 1, wherein said initialization process for said loaded and uninitialized protocol stack includes the transmission of at least one packet over said network, said packet including address and data information and conforming to said one of the plurality of protocols.

4. A method according to claim 1, wherein said network interface device comprises a network interface board in communication with a peripheral device.

5. A method according to claim 1, wherein said network interface device comprises an embedded network expansion board in communication with a peripheral device.

6. A method according to claim 1, wherein said network interface device comprises a network expansion device in communication with a peripheral device.

7. A method according to claim 1, wherein said network interface device comprises a network interface board in communication with a network attached device.

8. A method according to claim 1, wherein said network interface device comprises an embedded network expansion board in communication with a network attached device.

9. A method according to claim 1, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

10. A method according to claim 1, wherein said network interface device comprises a network expansion device in communication with a network attached device.

11. A method according to claim 1, wherein said network interface device comprises a network interface board in communication with a network printer.

12. A method according to claim 1, wherein said network interface device comprises an embedded network expansion board in communication with a network printer.

13. A method according to claim 1, wherein said network interface device comprises a network expansion device in communication with a network printer.

14. A method according to claim 1, wherein said network interface device comprises an embedded network expansion board in communication with a network printer and said initialization process for said loaded and uninitialized protocol stack includes the transmission of at least one initialization-related packet.

15. A network interface device for communicating with other devices via a network on which a plurality of protocols may be utilized, said network interface device comprising:
a network interface over which packets including address and data information are received from the network, and over which packets to the network are transmitted; and
a processor that (i) executes a process within the network interface device which loads an uninitialized protocol stack that supports one of the plurality of protocols for communication on the network and that can be initialized by an initialization process, (ii) temporarily prohibits execution of the initialization process for said loaded and uninitialized protocol stack, (iii) enables the network interface device to receive packets from the network that include address and data information and that conform to said one of the plurality of protocols, and (iv) executes the initialization process for said loaded and uninitialized protocol stack upon receipt of a packet from the network conforming to said one of the plurality of protocols, said initialization process including the enablement of the network interface device to communicate packets on the network that include address and data information and that conform to said one of the plurality of protocols.

16. A network interface device according to claim 15, wherein said processor enables the network interface device to receive packets from the network by communication of said protocol stack with a protocol multiplexer in the network interface device whereby the protocol multiplexer receives all packets from the network that conform to said one of the plurality of protocols and passes said packets to said protocol stack.

17. A network interface device according to claim 15, wherein said initialization process for said loaded and uninitialized protocol stack includes the transmission of at least one packet over said network, said packet including address and data information and conforming to said one of the plurality of protocols.

18. A network interface device according to claim 15, wherein said network interface device is in communication with a peripheral device.

19. A network interface device according to claim 15, wherein said network interface device is in communication with a network printer.

20. A network interface device according to claim 15, wherein said network interface device is in communication with a network attached device.

21. A network interface device according to claim 15, wherein said network interface device is implemented on an embedded circuit board within a digital device, said digital device being removably attached to said network, wherein said embedded circuit board provides communication between said network and said digital device, and wherein said embedded circuit board also provides processing to support functional operation of said digital device.

22. Computer-executable process steps stored on a computer-readable medium, the computer-executable process steps to automatically trigger a protocol stack initialization process within a network interface device on a network on which a plurality of protocols may be utilized, said computer-executable process steps comprising:
code to load an uninitialized protocol stack within the network interface device, said loaded and uninitialized protocol stack being configured to support one of the plurality of protocols for communication on the network and to be initialized by an initialization process;
code to temporarily prohibit execution of the initialization process for said loaded and uninitialized protocol stack;
code to enable the network interface device to receive packets from the network that include address and data information and that conform to said one of the plurality of protocols; and
code to execute the initialization process for said loaded and uninitialized protocol stack upon receipt of a packet from the network conforming to said one of the plurality of protocols, said initialization process including the enablement of the network interface device to communicate packets on the network that include address and data information and that conform to said one of the plurality of protocols.

23. Computer-executable process steps according to claim 22, wherein said code to enable the network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

24. Computer-executable process steps according to claim 22, wherein said initialization process for said loaded and uninitialized protocol stack includes the transmission of at least one packet over said network, said packet including address and data information and conforming to said one of the plurality of protocols.

25. Computer-executable process steps according to claim 22, wherein said network interface device comprises a network interface board in communication with a peripheral device.

26. Computer-executable process steps according to claim 22, wherein said network interface device comprises an embedded network expansion board in communication with a peripheral device.

27. Computer-executable process steps according to claim 22, wherein said network interface device comprises a network expansion device in communication with a peripheral device.

28. Computer-executable process steps according to claim 22, wherein said network interface device comprises a network interface board in communication with a network printer.

29. Computer-executable process steps according to claim 22, wherein said network interface device comprises an embedded network expansion board in communication with a network printer.

30. Computer-executable process steps according to claim 22, wherein said network interface device comprises a network expansion device in communication with a network printer.

31. Computer-executable process steps according to claim 22, wherein said network interface device comprises a network interface board in communication with a network attached device.

32. Computer-executable process steps according to claim 22, wherein said network interface device comprises an embedded network expansion board in communication with a network attached device.

33. Computer-executable process steps according to claim 22, wherein said network interface device comprises a network expansion device in communication with a network attached device.

34. Computer-executable process steps according to claim 22, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

35. Computer-executable process steps according to claim 22, wherein said network interface device comprises an embedded network expansion board in communication with a network printer and said initialization process for said loaded and uninitialized protocol stack includes the transmission of at least one initialization-related packet.

36. A computer-readable medium which stores computer-executable process steps, the computer-executable process steps to automatically trigger a protocol stack initialization process within a network interface device on a network on which a plurality of protocols may be utilized, said computer-executable process steps comprising:

a loading step to load an uninitialized protocol stack within the network interface device, said loaded and uninitialized protocol stack being configured to support one of the plurality of protocols for communication on the network and also configured to be initialized by an initialization process;

a prohibiting step to temporarily prohibit execution of the initialization process for said loaded and uninitialized protocol stack;

an enabling step to enable the network interface device to receive packets from the network that include address and data information and that conform to said one of the plurality of protocols; and an executing step to execute the initialization process for said loaded and uninitialized protocol stack upon receipt of a packet from the network conforming to said one of the plurality of protocols, said initialization process including the enablement of the network interface device to communicate packets on the network that include address and data information and that conform to said one of the plurality of protocols.

37. A computer-readable medium according to claim 36, wherein said enabling step to enable the network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

38. A computer-readable medium according to claim 36, wherein said initialization process for said loaded and uninitialized protocol stack includes the transmission of at least one packet over said network, said packet including address and data information and conforming to said one of the plurality of protocols.

39. A computer-readable medium according to claim 36, wherein said network interface device comprises a network interface board in communication with a peripheral device.

40. A computer-readable medium according to claim 36, wherein said network interface device comprises an embedded network expansion board in communication with a peripheral device.

41. A computer-readable medium according to claim 36, wherein said network interface device comprises a network expansion device in communication with a peripheral device.

42. A computer-readable medium according to claim 36, wherein said network interface device comprises a network interface board in communication with a network printer.

43. A computer-readable medium according to claim 36, wherein said network interface device comprises an embedded network expansion board in communication with a network printer.

44. A computer-readable medium according to claim 36, wherein said network interface device comprises a network expansion device in communication with a network printer.

45. A computer-readable medium according to claim 36, wherein said network interface device comprises a network interface board in communication with a network attached device.

46. A computer-readable medium according to claim 36, wherein said network interface device comprises an embedded network expansion board in communication with a network attached device.

47. A computer-readable medium according to claim 36, wherein said network interface device comprises a network expansion device in communication with a network attached device.

48. A computer-readable medium according to claim 36, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

49. A computer-readable medium according to claim 36, wherein said network interface device comprises an embedded network expansion board in communication with a network printer and said initialization process for said loaded and uninitialized protocol stack includes the transmission of at least one initialization-related packet.

50. A method for automatically triggering a protocol stack initialization process within a network interface device on a network on which a plurality of protocols may be utilized, said network interface device being in communication with an application software module which sends to said network interface device a plurality of network services requests, said method comprising the steps of:
executing a process within the network interface device which loads an uninitialized protocol stack that supports one of the plurality of protocols for communication on the network and that is configured to be initialized by an initialization process;
temporarily prohibiting execution of the initialization process for said loaded and uninitialized protocol stack;
enabling the network interface device to receive packets from the network that include address and data information and that conform to said one of the plurality of protocols;
enabling said network interface device to receive at least one network services request from said application software module which requires the use of said loaded and uninitialized protocol stack;
determining whether the network interface device has received from said application software module at least one of said network service requests that requires the use of said loaded and uninitialized protocol stack;
determining whether the network interface device has received a packet from the network conforming to said one of the plurality of protocols; and
executing the initialization process for said loaded and uninitialized protocol stack in response to a determination that the network interface device has received from said application software module at least one of said network service requests that requires the use of said loaded and uninitialized protocol stack or in response to a determination that the network interface device has received a packet from the network conforming to said one of the plurality of protocols, said initialization process including the enablement of the network interface device to communicate packets on the network that include address and data information and that conform to said one of the plurality of protocols.

51. A method according to claim 50, wherein said step of enabling the network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

52. A method according to claim 50, wherein said initialization process for said loaded and uninitialized protocol stack includes the transmission of at least one packet over said network, said packet including address and data information and said packet conforming to said one of the plurality of protocols.

53. A method according to claim 50, wherein said network interface device comprises a network interface board in communication with a peripheral device.

54. A method according to claim 50, wherein said network interface device comprises an embedded network expansion board in communication with a peripheral device.

55. A method according to claim 50, wherein said network interface device comprises a network expansion device in communication with a peripheral device.

56. A method according to claim 50, wherein said network interface device comprises a network interface board in communication with a network printer.

57. A method according to claim 50, wherein said network interface device comprises an embedded network expansion board in communication with a network printer.

58. A method according to claim 50, wherein said network interface device comprises a network expansion device in communication with a network printer.

59. A method according to claim 50, wherein said network interface device comprises a network interface board in communication with a network attached device.

60. A method according to claim 50, wherein said network interface device comprises an embedded network expansion board in communication with a network attached device.

61. A method according to claim 50, wherein said network interface device comprises a network expansion device in communication with a network attached device.

62. A method according to claim 50, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

63. A method according to claim 50, wherein said network interface device comprises an embedded network expansion board in communication with a network printer and said initialization process for said loaded and uninitialized protocol stack includes the transmission of at least one initialization-related packet.

64. A method according to claim 50, wherein said application software module is executed within a device that is locally connected to said network interface device.

65. A method according to claim 50, wherein said application software module is executed within said network interface device.

66. A network interface device for communicating with other devices via a network on which a plurality of protocols may be utilized, said network interface device also in communication with an application software module which sends to said network interface device a plurality of network services requests, said network interface device comprising:
a network interface over which packets including address and data information are received from the network, and over which packets to the network are transmitted; and a processor that (i) executes a process within the network interface device which loads an uninitialized protocol stack that supports one of the plurality of protocols for communication on the network and that is configured to be initialized by an initialization process, (ii) temporarily prohibits execution of the initialization process for said loaded and uninitialized protocol stack, (iii) enables the network interface device to receive packets from the network that include address and data information and that conform to said one of the plurality of protocols, (iv) enables said network interface device to receive at least one network services request from said application software module that requires the use of said loaded and uninitialized protocol stack, (v) determines whether the network interface device has received from said application software module at least one of said network service requests that requires the use of said loaded and uninitialized protocol stack, (vi) determines whether the network interface device has received a packet from the network conforming to said one of the plurality of protocols, and (vii) executes the initialization process for said loaded and uninitialized protocol stack in response to a determination that the network interface device has received from said application software module at least one of said network service requests that requires the use of said loaded and uninitialized protocol stack or in response to a determination that the network interface device has received a packet from the network conforming to said one of the plurality of protocols, said initialization process including the enablement of the network interface device to communicate packets on the network that include address and data information and that conform to said one of the plurality of protocols.

67. A network interface device according to claim 66, wherein said processor enables the network interface device to receive packets from the network by communication of said protocol stack with a protocol multiplexer in the network interface device whereby the protocol multiplexer receives all packets from the network that conform to said one of the plurality of protocols and passes said packets to said protocol stack.

68. A network interface device according to claim 66, wherein said initialization process for said loaded and uninitialized protocol stack includes the transmission of at least one packet over said network, said packet including address and data information and conforming to said one of the plurality of protocols.

69. A network interface device according to claim 66, wherein said network interface device is in communication with a peripheral device.

70. A network interface device according to claim 66, wherein said network interface device is in communication with a network printer.

71. A network interface device according to claim 66, wherein said network interface device is in communication with a network attached device.

72. A network interface device according to claim 66, wherein said network interface device is located on an embedded circuit board within a digital device, said digital device being removably attached to said network, wherein said embedded circuit board provides communication between said network and said digital device, and wherein said embedded circuit board also provides processing to support functional operation of said digital device.

73. A network interface device according to claim 66, wherein said application software module is executed within a device that is locally connected to said network interface device.

74. A network interface device according to claim 66, wherein said application software module is executed within said processor of said network interface device.

75. Computer-executable process steps stored on a computer-readable medium, the computer-executable process steps to automatically trigger a protocol stack initialization process within a network interface device on a network on which a plurality of protocols may be utilized, said network interface device being in communication with an application software module which sends to said network interface device a plurality of network services requests, said computer-executable process steps comprising:

code to load an uninitialized protocol stack within the network interface device, said uninitialized protocol stack being configured to support one of the plurality of protocols for communication on the network and to be initialized by an initialization process;

code to temporarily prohibit execution of the initialization process for said loaded and uninitialized protocol stack;

code to enable the network interface device to receive packets from the network that include address and data information and that conform to said one of the plurality of protocols;

code to enable said network interface device to receive at least one network services request from said application software module that requires the use of said loaded and uninitialized protocol stack;

code to determine whether the network interface device has received from said application software module at least one of said network service requests that requires the use of said loaded and uninitialized protocol stack;

code to determine whether the network interface device has received a packet from the network conforming to said one of the plurality of protocols; and code to execute the initialization process for said loaded and uninitialized protocol stack in response to a determination that the network interface device has received from said application software module at least one of said network service requests that requires the use of said loaded and uninitialized protocol stack or in response to a determination that the network interface device has received a packet from the network conforming to said one of the plurality of protocols, said initialization process including the enablement of the network interface device to communicate packets on the network that include address and data information and that conform to said one of the plurality of protocol.

76. Computer-executable process steps according to claim 75, wherein said code to enable said network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

77. Computer-executable process steps according to claim 75, wherein said initialization process for said loaded and uninitialized protocol stack includes the transmission of at least one packet over said network, said packet including address and data information and conforming to said one of the plurality of protocols.

78. Computer-executable process steps according to claim 75, wherein said network interface device comprises a network interface board in communication with a peripheral device.

79. Computer-executable process steps according to claim 75, wherein said network interface device comprises an embedded network expansion board in communication with a peripheral device.

80. Computer-executable process steps according to claim 75, wherein said network interface device comprises a network expansion device in communication with a peripheral device.

81. Computer-executable process steps according to claim 75, wherein said network interface device comprises a network interface board in communication with a network printer.

82. Computer-executable process steps according to claim 75, wherein said network interface device comprises an embedded network expansion board in communication with a network printer.

83. Computer-executable process steps according to claim 75, wherein said network interface device comprises a network expansion device in communication with a network printer.

84. Computer-executable process steps according to claim 75, wherein said network interface device comprises a network interface board in communication with a network attached device.

85. Computer-executable process steps according to claim 75, wherein said network interface device comprises an embedded network expansion board in communication with a network attached device.

86. Computer-executable process steps according to claim 75, wherein said network interface device comprises a network expansion device in communication with a network attached device.

87. Computer-executable process steps according to claim 75, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

88. Computer-executable process steps according to claim 75, wherein said network interface device comprises an embedded network expansion board in communication with a network printer and said initialization process for said loaded and uninitialized protocol stack includes the transmission of at least one initialization-related packet.

89. Computer-executable process steps according to claim 75, wherein said application software module is executed within a device that is locally connected to said network interface device.

90. Computer-executable process steps according to claim 75, further comprising code to execute said application software module.

91. A computer-readable medium which stores computer-executable process steps, the computer-executable process steps to automatically trigger a protocol stack initialization process within a network interface device on a network on which a plurality of protocols may be utilized, said network interface device being in communication with an application software module which sends to said network interface device a plurality of network services requests, said computer-executable process steps comprising:

a loading step to load an uninitialized protocol stack within the network interface device, said uninitialized protocol stack being configured to support one of the plurality of protocols for communication on the network and to be initialized by an initialization process;

a prohibiting step to temporarily prohibit execution of the initialization process for said loaded and uninitialized protocol stack;

an enabling step to enable the network interface device to receive packets from the network that include address and data information and that conform to said one of the plurality of protocols;

an enabling step to enable said network interface device to receive at least one network services request from said application software module that requires the use of said loaded and uninitialized protocol stack;

a determining step to determine whether the network interface device has received from said application software module at least one of said network service requests that requires the use of said loaded and uninitialized protocol stack;

a determining step to determine whether the network interface device has received a packet from the network conforming to said one of the plurality of protocols; and an executing step to execute the initialization process for said loaded and uninitialized protocol stack in response to a determination that the network interface device has received from said application software module at least one of said network service requests that requires the use of said loaded and uninitialized protocol stack or in response to a determination that the network interface device has received a packet from the network conforming to said one of the plurality of protocols, said initialization process including the enablement of the network interface device to communicate packets on the network that include address and data information and that conform to said one of the plurality of protocols.

92. A computer-readable medium according to claim 91, wherein said enabling step to enable the network interface device to receive packets from the network comprises communication of said protocol stack with a protocol multiplexer in the network interface device whereby the protocol multiplexer receives all packets from the network that conform to said one of the plurality of protocols and passes said packets to said protocol stack.

93. A computer-readable medium according to claim 91, wherein said initialization process for said loaded and uninitialized protocol stack includes the transmission of at least one packet over said network, said packet including address and data information and conforming to said one of the plurality of protocols.

94. A computer-readable medium according to claim 91, wherein said network interface device comprises a network interface board in communication with a peripheral device.

95. A computer-readable medium according to claim 91, wherein said network interface device comprises an embedded network expansion board in communication with a peripheral device.

96. A computer-readable medium according to claim 91, wherein said network interface device comprises a network expansion device in communication with a peripheral device.

97. A computer-readable medium according to claim 91, wherein said network interface device comprises a network interface board in communication with a network printer.

98. A computer-readable medium according to claim 91, wherein said network interface device comprises an embedded network expansion board in communication with a network printer.

99. A computer-readable medium according to claim 91, wherein said network interface device comprises a network expansion device in communication with a network printer.

100. A computer-readable medium according to claim 91, wherein said network interface device comprises a network interface board in communication with a network attached device.

101. A computer-readable medium according to claim 91, wherein said network interface device comprises an embedded network expansion board in communication with a network attached device.

102. A computer-readable medium according to claim 91, wherein said network interface device comprises a network expansion device in communication with a network attached device.

103. A computer-readable medium according to claim 91, wherein said network interface device comprises an embedded circuit board within a digital device, said digital device being removably attached to said network, wherein said embedded circuit board provides communication between said network and said digital device, and wherein said embedded circuit board also provides processing to support functional operation of said digital device.

104. A computer-readable medium according to claim 91, wherein said network interface device comprises an embedded network expansion board in communication with a network printer and said initialization process for said loaded and uninitialized protocol stack includes the transmission of at least one initialization-related packet.

105. A computer-readable medium according to claim 91, wherein said application software module is executed within a device that is locally connected to said network interface device.

106. A computer-readable medium according to claim 91, further comprising an executing step to execute said application software module.

* * * * *

UNITED STATES PATENT AND TRADEMARK OFFICE
CERTIFICATE OF CORRECTION

PATENT NO. : 6,665,724 B2
DATED : December 16, 2003
INVENTOR(S) : Thomas David Lawrence It is certified that error appears in the above-identified patent and that said Letters Patent is hereby corrected as shown below:

Column 20,
Line 49, "col" should read -- cols --.

Signed and Sealed this

Twenty-seventh Day of July, 2004

JON W. DUDAS
*Acting Director of the United States Patent and Trademark Office*